United States Patent

[11] 3,545,360

[72] Inventors Willi Guenther
Gammertinger Strasse 7, Stuttgart-Mohringen;
Werner Zink, Uhloergstrasse 12, Aich Kreis, Nurtingen, Germany
[21] Appl. No. 695,718
[22] Filed Jan. 4, 1968
[45] Patented Dec. 8, 1970
[32] Priority Jan. 10, 1967
[33] Germany
[31] No. Z12,635

[54] DEVICE FOR THE ELECTRONIC CONTROL OF CURTAIN SHUTTERS
5 Claims, 5 Drawing Figs.
[52] U.S. Cl. .................................................. 95/57
[51] Int. Cl. ..................................................... G03b 9/28
[50] Field of Search ........................................... 95/53, 57, 60, (Inquired)

[56] References Cited
UNITED STATES PATENTS
3,124,049 3/1964 Ball .............................. 95/57UX
3,319,554 5/1967 Bresson ........................ 95/53
3,448,671 6/1969 Rentschler ................... 95/53

FOREIGN PATENTS
1,258,728 1/1968 Germany ...................... 95/53
1,272,116 7/1968 Germany ...................... 95/53

*Primary Examiner*—John M. Horan
*Assistant Examiner*—Monroe H. Hayes
*Attorney*—Singer, Stern & Carlberg ABSTRACT: A single lens mirror reflex camera is equipped with a curtain shutter suitable for making exposures of very short durations, such as one five-hundredth and one one-thousandth of a second. The mechanism for operating the automatic diaphragm and reflecting mirror is operatively coupled with a control member which controls the release of the two curtains of the curtain shutter, whereby the release of the second curtain is electronically controlled in relation to the desired short exposure time by a device providing an electronically produced magnetic field. This device includes a switch connected with an RC circuit and operated by the control member, and a control stop in the mirror operating mechanism of the camera effects an operation of the control member for unlocking the first curtain and also controls in timely relationship thereto the switch for the RC-means to control said magnetic field, in which the switch has contacts which are adjustable with respect to time so as to form a contact control of the switch member.

PATENTED DEC 8 1970

DEVICE FOR THE ELECTRONIC CONTROL OF CURTAIN SHUTTERS

The invention relates to a device for the electronic control of curtain shutters which permit extremely short exposure times, such as one five-hundredths sec. and one one-thousandths sec. The object of the invention is a specific construction of this device so as to adapt curtain shutters to be used also in single lens mirror reflex cameras.

Curtain shutters are known in which the commonly tensioned and in this tensioned position mechanically locked curtains are successively released at predetermined time intervals in such manner that the release of the first curtain is effected mechanically and the second curtain is released by means of an electromagnet. The timing of the electromagnetic release is controlled by the discharge pulse of a capacitor whose charging commences with the opening of the shutter and whose charging time is influenced by one or more resistances.

Shutters of this type are not readily suitable for single lens mirror reflex cameras because in these cameras certain features have to be taken into account which view-finder cameras do not have. In mirror reflex cameras it is not possible to operate the shutter the moment the shutter is released. Rather, there has first to be released a camera drive for causing the diaphragm to open to the preselected aperture value and/or the reflecting mirror to move from its viewing position to the exposure position. Only upon completion of these operations can an exposure with the adjusted time value take place. The problem, then, is to establish a coordination between the operation of the electronically controlled shutter and the functions of a single lens mirror reflex camera; no information thereon can be derived from shutters known heretofore.

In accordance with the present invention, the use of electronically controlled curtain shutters in single lens mirror reflex cameras is made possible in that the camera drive actuating the automatic diaphragm and/or operating the mirror is provided with a control member which, when the camera drive runs off, releases the first curtain and at about the same time actuates an electronic timing member, i.e. a RC-member, which determines the time period of holding the electronically controlled second curtain.

Preferably, the camera drive, particularly the mirror mechanism, is provided with a control stop which deflects a release and actuating member that releases a lock on the drive roller of the first curtain and, adjustable thereto with respect to time, controls a switch for the RC-member to act upon the electromagnet.

Another feature of the invention is that the contacts of the switch just mentioned are made adjustable. This has the result that the instant of actuating the RC-member can be accurately timed in milliseconds. Accordingly, the contact for the connection of the RC-member may be operated at the same time the first curtain is released, or with only a minor delay.

These and other objects of the invention will further be described by way of an exemplary embodiment of the invention and with reference to the accompanying drawings, in which.

Figure 1:
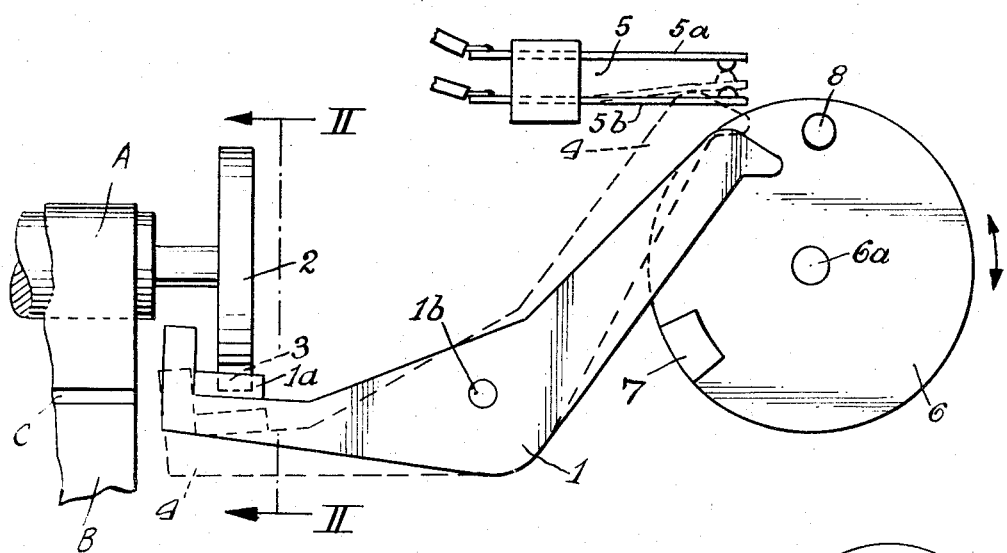
FIG. 1 illustrates in an elevation view the release and switch member controlled by the mirror drive mechanism.
Figure 2:
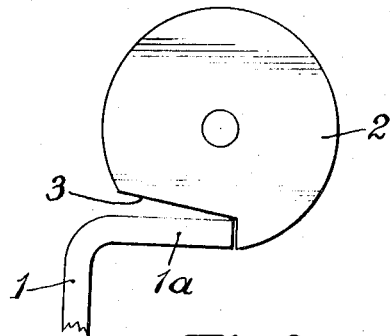
FIG. 2 is a view along the line II–II of FIG. 1.

Referring to FIGS. 1 and 2, the drive roller 2 associated with the first curtain A is locked after winding of the shutter in that a lever 1 pivotally supported at 1b between its ends and which at the proper time is actuated by the mirror mechanism, engages with a lateral projection 1a at one of its ends a groove 3 in the circumference of the roller 2. A circular disk 6 which is rotatable in both directions about its center axis 6a is driven by the mirror mechanism and carries on its face a control member 7 for moving the lever 1 to the unlocking position 4 illustrated in broken lines and another control member 8 for moving the lever 1 to the locking position illustrated in solid lines. In the locking position the drive roller 2 of the first curtain is locked by the projection 1a of the lever 1 which enters the groove 3, and the switch 5 associated with the electronic timing member is open, with the reflecting mirror having moved into viewing position, while in the unlocking position 4 the projection 1a of the lever 1 has been moved out of the groove 3 so that the drive roller 2 is able to rotate and the switch 5 is closed by the other end of the lever 1. The lever 1 is moved by the control member 7 on the clockwise rotating disk 6 from the locking into the unlocking position preferably at a time before the mirror mechanism has completed the final exposure position of the mirror.

An electronic timing member for a predetermined time period to be established serves a combination of RC-members known per se, of which there are arranged a number in the camera or in the shutter, respectively, and which are selected by slide contacts in relation to the time adjustment. The switch 5, whose contact arms are adjustable with respect to the distance between the same, causes the entire resistance-capacitor plate to be supplied with voltage or discontinues the supply of that voltage, respectively. The desired combination of RC-members is selected by the mentioned slide contacts which are moved in unison with the exposure time setting member operated by hand. The capacitor current of the selected RC-combination energizes and sustains an electromagnet which keeps the second curtain locked as long as that is required in view of the adjusted exposure time and the diaphragm aperture necessary for this time. Depending upon whether the charging or the discharging current of the capacitor is used for feeding the magnet, the operation of the switch 5 is as illustrated or one inversely thereto.

Figure 3:
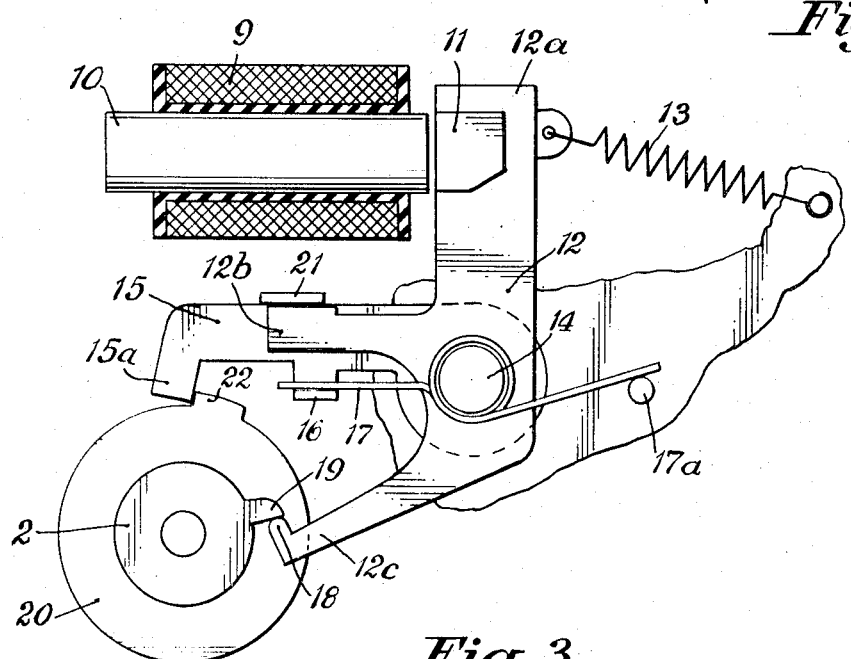
FIG. 3 is an elevational view of the switch drive between the electromagnet and the drives for the curtains.

The electromagnet according to FIG. 3 includes a winding 9 and an iron core 10 cooperating with an armature 11. The armature 11 is mounted on the vertical arm 12a of a three-armed lever 12 which is rotatable about an axis 14 fixedly connected with the camera housing. A horizontal arm 12b of the lever 12 is in cooperation with a lateral abutment lug 21 of a lever 15 which is rotatable about the same axis 14 as the lever 12, and a somewhat downwardly inclined arm 12c of the lever 12 is at its outer end provided with a lug 18 which cooperates with a projection 19 on the drive roller 2 of the first curtain. The free end of the lever 15 is bent downwardly so as to form a nose 15a which engages a circumferential projection 22 on the circumference of the roller 20 of the second curtain B. The exposure slip between the two curtains is designated with C. In the illustrated locked position the lever 15 is held by a spring 17, one end of which engages a horizontal projection 16 on the lever 15 and seeks to rotate the lever 15 counterclockwise. The other end of the spring 17 engages a pin 17a on the camera housing. The lever 12 is acted upon by a helical spring 13 which tries to rotate the lever 12 clockwise.

Figure 4:
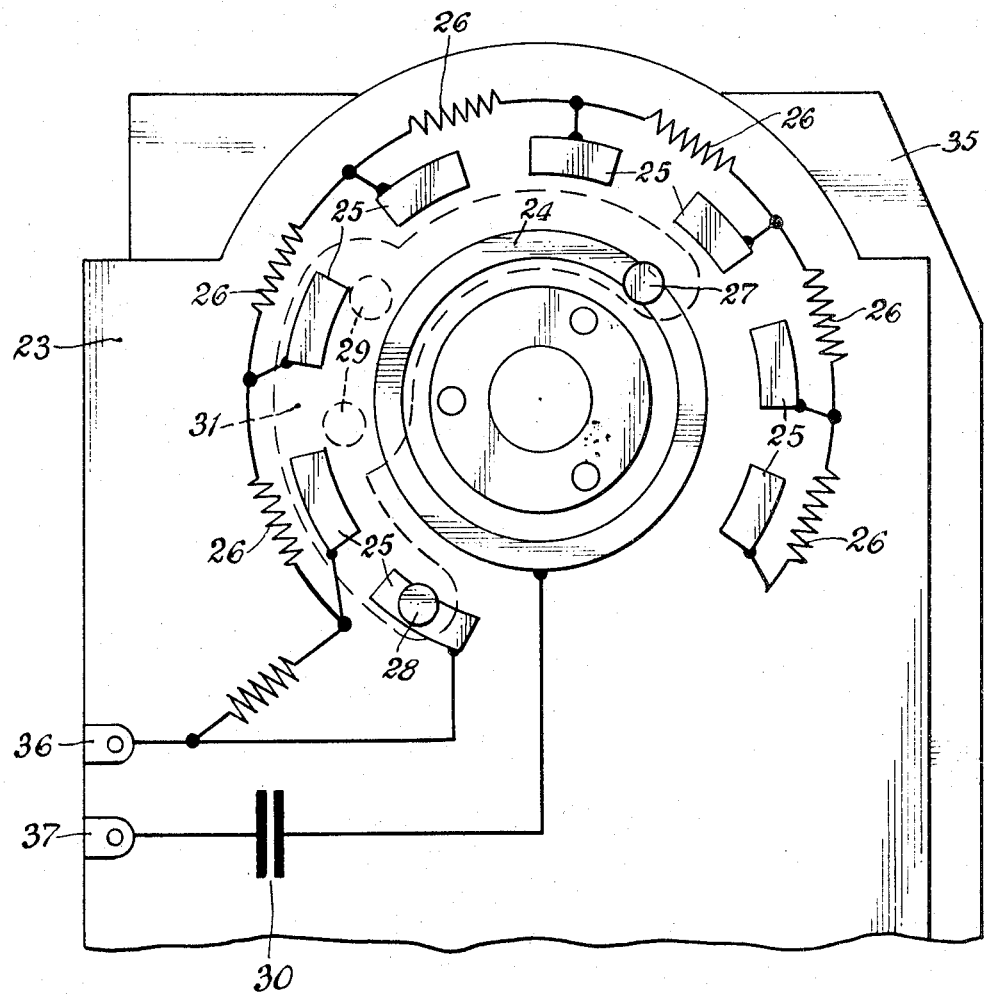
FIG. 4 is a diagrammatic top elevation view of a contact device from the RC-member corresponding to the selected shutter speed is picked by means of slidable contacts.

FIG. 4 illustrates a contact carrying insulator plate 23 which is provided with a common inner current conducting bar in the form of a closed circuit ring 24 and an outer circular series of individual contact members 25 to which resistances 26 are connected. A capacitor 30 is arranged in circuit with the ring 24 and contact members 25 in such manner that each individual contact member selected with respect to the trunk line corresponds to a predetermined RC-member and hence satisfies a given exposure time value. The contact members are selected by contacts moved in unison with the exposure time setting member and of which one contact 27 slides along the contact ring 24 while another contact 28 slides along the series of contact members 25.

The contacts 27 and 28 are attached to the lower surface of a common arc-shaped flat contact spring 31 which is secured by rivets 29 or the like to the shutter speed selecting disk 32 of the camera. The capacitor 30 together with the selected resistance 26 form a shutter speed determining combination.

Figure 5:
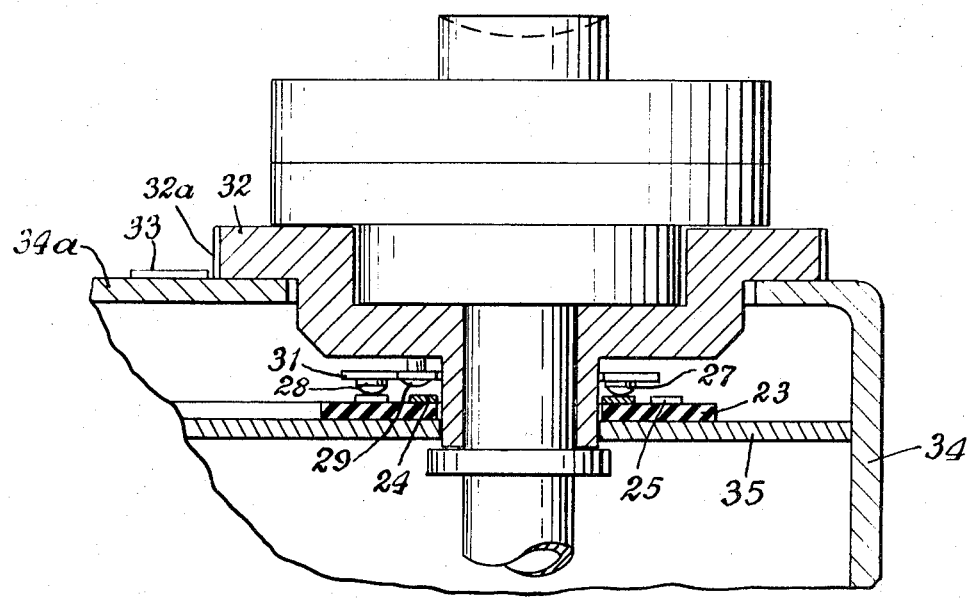
FIG. 5 is an axial sectional view of the contact and shutter speed selecting device.

FIG. 5 discloses in an axially sectional view a shutter speed selecting device of which a shutter speed selecting disk 32 is so mounted as to extend partially into the camera housing 34. The contact carrying plate 23 is mounted on a supporting plate 35 within the camera housing 34. On the upper face of the top wall 34a of the camera housing 34 is arranged a fixed index 33 opposite a shutter speed scale 32a arranged on the outer periphery of the disk 32. The two terminals 5a and 5b of the switch 5 are to be conductively connected with the terminals 36 and 37 of the circuit of the shutter speed selecting device.

The operation of the device is as follows: During the winding of the shutter, the roller 2 of the first curtain which is clockwise tensioned rotates the lever 12 counterclockwise because the projection 19 engages the lug 18 on the arm 12c of the lever 12 so that the vertical lever arm 12a moves the armature 11 toward the magnet core 10 against the action of the spring 13. This has the advantage that the magnet, when later energized, merely has to hold the armature 11. Furthermore, when winding the shutter, the release and switch member 1 drops into the locking groove 3 preferably provided at the other side of the roller 2 as that shown in FIG. 2 and thereby prevents the wound up first curtain from unwinding.

With the release of the shutter the drive for closing the diaphragm and changing the position of the mirror is set into operation. The disk 6 of this drive operates by means of the cam 7 the lever 1 and moves it into its release and switch closing position 4 prior to the running off of said drive. This releases the roller 2 of the first curtain for its runoff and that RC-member is energized which insures a holding of the roller 20 of the second curtain by the magnet in correspondence with the adjusted exposure time value.

The now following flow of current through the magnet winding 9 will in no way change the position of the levers 12, 15. Although the projection 19 of the roller 2 of the first curtain has moved away from the lug 18 of the lever 12, the latter is held in its position by the magnetic force of the winding 9 and the iron core 10 as long as there is a flow of current. The same applies to the lever 15 the rotational position of which depends on that of the lever 12. This means that the roller 20 of the second curtain is locked by the engagement of its circumferential projection 22 with the nose 15a of the lever 15.

This locking position is released, however, and the second curtain is permitted to run off as soon as the electromagnet 9, 10 becomes currentless. Then the spring 13 causes the lever 12 to rotate clockwise and due to the engagement of the lever arm 12b with the lateral lug 21 on the lever 15, the projection of the roller 20 is released by the nose 15a against the force of the spring 17 and the roller 20 rotates clockwise. The second curtain thus set into motion follows the first curtain and a diaphragm aperture is formed which corresponds to the exposure time value adjusted on the camera.

The present invention, therefore, provides a curtain shutter with electronic time control for use in single lens mirror reflex cameras, whereby the shutter control is such that in the absence of any intermediary members or mechanisms extremely short exposure time values can be obtained.

We claim:

1. A device for the electronic control of a curtain shutter in a single lens mirror reflex camera provided with a drive means operating an automatic diaphragm and an adjustable mirror, said curtain shutter including commonly tensioned and locked first and second curtains, means for successively unlocking said curtains upon release of the shutter by means providing an electronically produced magnetic field, a control member operatively connected with said drive means for effecting during the running-off period of said drive means first a release of said first curtain and at substantially the same time an actuation of an electronic RC-timing means which determines the holding period of time of the electronically releasable second curtain, and including a switch 5 connected with said RC-means and operated by said control member, and a control stop 7 provided in the mirror operating mechanism of the camera which effects an operation of said control member 1 for unlocking said first curtain and also controls in timely relationship thereto said switch for said RC-means to control said magnetic field, said switch being provided with contacts which are adjustable with respect to time so as to form a contact control of said switch member.

2. A device according to claim 1, including an electromagnet having a winding energizable by the current of the RC-means, and control means for locking and unlocking the operation of said second curtain, said control means comprising two levers of which one is provided with a projection for locking said second curtain, said second curtain having a drive roller having a locking means and with a stop for unlocking said drive roller, said stop being engaged by said other lever upon deenergization of said magnet.

3. A device according to claim 2, wherein said one lever has three arms of which one arm carries a magnet armature, another arm control said unlocking stop of said other lever, and the third arm cooperates with a control projection on the roller of said first curtain.

4. A device according to claim 2, wherein said one lever has three arms of which one carries a magnet armature, another arm controls said unlocking stop of said other lever, and the third arm cooperates with a control projection on the roller of said first curtain, whereby upon winding of said curtain shutter said one lever including said magnet armature disposed on it is moved against the action of a spring in engagement with said magnet by means of a control connection.

5. A device according to claim 1, including a switch connected with said RC-means and operated by said control member, and a control stop 7 provided in the mirror operating mechanism of the camera which effects an operation of said control member 1 for unlocking said first curtain and also controls in timely relationship thereto said switch for said RC-means to control said magnetic field, said RC-timing means being selected by said switch upon operation of said control member 1 from a contact plate provided with slidable contacts which are advanced to their respective timing positions by the timing device of the camera.

UNITED STATES PATENT OFFICE
CERTIFICATE OF CORRECTION

Patent No. 3,545,360                 Dated December 8, 1970

Inventor(s) Willi Günther etal.

It is certified that error appears in the above-identified patent and that said Letters Patent are hereby corrected as shown below:

On the cover sheet insert -- [73] Assignee: Zeiss Ikon Aktiengesellschaft --.

Signed and sealed this 6th day of March 1973.

(SEAL)
Attest:

EDWARD M. FLETCHER, JR.            ROBERT GOTTSCHALK
Attesting Officer                 Commissioner of Patents